US012791189B2

(12) United States Patent
Binek et al.

(10) Patent No.: US 12,791,189 B2
(45) Date of Patent: Nov. 10, 2026

(54) FLOW ASSISTED INTEGRAL SPLASH PLATE

(71) Applicant: RTX Corporation, Farmington, CT (US)

(72) Inventors: Lawrence A. Binek, Glastonbury, CT (US); Frederick M. Rosenberger, West Hartford, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/892,211

(22) Filed: Sep. 20, 2024

(65) Prior Publication Data

US 2026/0085836 A1 Mar. 26, 2026

(51) Int. Cl.

| | |
|---|---|
| ***F23R 3/28*** | (2006.01) |
| ***F02K 3/10*** | (2006.01) |
| ***F23D 7/00*** | (2006.01) |
| ***F23R 3/00*** | (2006.01) |
| ***F23R 3/10*** | (2006.01) |
| ***F23R 3/52*** | (2006.01) |

(52) U.S. Cl.

CPC ................ *F23R 3/283* (2013.01); *F02K 3/10* (2013.01); *F23D 7/00* (2013.01); *F23R 3/002* (2013.01); *F23R 3/10* (2013.01); *F23R 3/52* (2013.01); *F23D 2900/11001* (2013.01)

(58) Field of Classification Search

CPC .. F23R 3/10; F23R 3/002; F23R 3/283; F23R 3/52; F02K 3/10; F23D 7/00; F23D 2900/11001

See application file for complete search history.

(56) References Cited

U.S. PATENT DOCUMENTS

| | | | | | |
|---|---|---|---|---|---|
| 3,182,646 | A | * | 5/1965 | Kuechenmeister .. | F02M 69/047 261/23.2 |
| 3,430,443 | A | * | 3/1969 | Richardson ............... | F23R 3/02 60/738 |
| 3,719,042 | A | | 3/1973 | Chamberlain | |
| 4,887,425 | A | * | 12/1989 | Vdoviak ................. | F23D 23/00 60/761 |
| 4,967,562 | A | * | 11/1990 | Shekleton ................. | F23R 3/28 60/738 |
| 4,967,563 | A | * | 11/1990 | Shekleton .............. | F23R 3/045 60/743 |

(Continued)

FOREIGN PATENT DOCUMENTS

| | | | |
|---|---|---|---|
| EP | 4414608 | A2 | 8/2024 |
| WO | 2023/113990 | A1 | 6/2023 |
| WO | 2023/238012 | A1 | 12/2023 |

OTHER PUBLICATIONS

Extended European Search Report dated Feb. 23, 2026 for European Patent Application No. 25200612.7.

*Primary Examiner* — Jason H Duger

(74) *Attorney, Agent, or Firm* — Bachman & LaPointe, P.C.

(57) ABSTRACT

A gas turbine engine case structure includes the unitary combination of: a case wall having an inner surface and an outer surface; a fuel injector protruding inward from the case wall and having an outlet; and a splash plate having a first face and a second face. The fuel injector outlet faces the second face. A support connects the splash plate to the case wall and the fuel injector. The support directs air to a gap between the splash plate and the injector.

17 Claims, 17 Drawing Sheets

(56) References Cited

U.S. PATENT DOCUMENTS

| | | | | | |
|---|---|---|---|---|---|
| 4,984,424 | A * | 1/1991 | Shekleton | F23R 3/28 | 60/734 |
| 4,989,404 | A * | 2/1991 | Shekleton | F23R 3/28 | 60/743 |
| 5,140,807 | A * | 8/1992 | Shekleton | F23R 3/28 | 60/738 |
| 5,263,316 | A | 11/1993 | Shekleton | | |
| 5,265,425 | A * | 11/1993 | Howell | F23R 3/30 | 60/743 |
| 11,441,572 | B2 | 9/2022 | Solomon et al. | | |
| 11,465,247 | B2 | 10/2022 | Binek et al. | | |
| 11,649,964 | B2 | 5/2023 | Binek et al. | | |
| 11,754,287 | B2 | 9/2023 | Binek et al. | | |
| 11,994,297 | B2 | 5/2024 | Ryon et al. | | |
| 12,072,101 | B2 * | 8/2024 | Binek | F23R 3/283 | |
| 12,116,934 | B2 | 10/2024 | Binek et al. | | |
| 2020/0332719 | A1 * | 10/2020 | Binek | B22F 5/009 | |
| 2022/0082257 | A1 * | 3/2022 | Binek | F23R 3/286 | |
| 2022/0170636 | A1 * | 6/2022 | Binek | F23R 3/28 | |
| 2022/0187030 | A1 | 6/2022 | Ruiz et al. | | |
| 2022/0307694 | A1 | 9/2022 | Binek et al. | | |
| 2022/0316400 | A1 | 10/2022 | Binek et al. | | |
| 2022/0316408 | A1 * | 10/2022 | Binek | F01D 9/02 | |
| 2023/0055939 | A1 | 2/2023 | Binek et al. | | |
| 2023/0060291 | A1 | 3/2023 | Manteiga et al. | | |
| 2023/0099009 | A1 | 3/2023 | Lewandowski et al. | | |

* cited by examiner

356

FLOW ASSISTED INTEGRAL SPLASH PLATE

BACKGROUND

The disclosure relates to gas turbine engines. More particularly, the disclosure relates to additively manufactured fuel manifolds.

Gas turbine engines (used in propulsion and power applications and broadly inclusive of turbojets, turboprops, turbofans, turboshafts, industrial gas turbines, and the like) may include an additively manufactured fuel manifold receiving fuel through one or more inlet ports and discharging fuel from a plurality of outlet ports. The manifold in outlet ports may, themselves, be fuel nozzles as part of the additively manufactured piece. Alternatively, manifold outlet ports may be bosses or other fittings for receiving separate fuel nozzles.

SUMMARY

One aspect of the disclosure involves a gas turbine engine case structure comprising the unitary combination of: a case wall having an inner surface and an outer surface;

a fuel injector protruding inward from the case wall and having an outlet; a splash plate having a first face and a second face, the fuel injector outlet facing the second face; and a support connecting the splash plate to the case wall and the fuel injector. The support comprises at least one passageway with an outlet opening between the splash plate and the injector.

In a further embodiment of any of the foregoing embodiments, additionally and/or alternatively, the support comprises a ligament section extending between the case wall and the splash plate and a gusset section between the ligament section and the fuel injector.

In a further embodiment of any of the foregoing embodiments, additionally and/or alternatively, the at least one passageway passes through the gusset section.

In a further embodiment of any of the foregoing embodiments, additionally and/or alternatively, the at least one passageway passes through the gusset section from at least one inlet at an outer edge of the ligament.

In a further embodiment of any of the foregoing embodiments, additionally and/or alternatively, the at least one passageway is a longitudinally arrayed plurality of passageways.

In a further embodiment of any of the foregoing embodiments, additionally and/or alternatively, the at least one passageway widens circumferentially and shortens longitudinally from inlet to outlet.

In a further embodiment of any of the foregoing embodiments, additionally and/or alternatively, the ligament section has a leading edge away from the fuel injector and the at least one passageway passes from at least one inlet along the leading edge.

In a further embodiment of any of the foregoing embodiments, additionally and/or alternatively: the at least one passageway is a single passageway; the at least one inlet along the leading edge is a single inlet; the single passageway has a single outlet; and the single passageway becomes less elongate in cross-section from inlet to outlet.

In a further embodiment of any of the foregoing embodiments, additionally and/or alternatively, the single passageway tapers in cross-sectional area from inlet to outlet.

A further embodiment of any of the foregoing embodiments may additionally and/or alternatively include the gas turbine engine case structure having a circumferential array of: said fuel injectors; said splash plates and said supports.

A further embodiment of any of the foregoing embodiments may additionally and/or alternatively include at least one fuel inlet and a fuel plenum fluidically between the at least one fuel inlet and the fuel injectors.

A further aspect of the disclosure involves gas turbine engine including the case structure as a combustor case and further comprising: a rotor having a compressor section and a turbine section; and a gaspath passing sequentially through the compressor section, a combustion chamber of the combustor case, and the turbine section.

A further aspect of the disclosure involves a method for manufacturing the gas turbine engine case structure, the method comprising additive manufacture as a single piece at least precursors of: the case wall; the fuel injector; the splash plate; and the support.

A further embodiment of any of the foregoing embodiments may additionally and/or alternatively include: machining the single piece to form the fuel injector outlet; and plugging an access hole through which the machining was performed.

In a further embodiment of any of the foregoing embodiments, additionally and/or alternatively, the additive manufacture is powder bed fusion laser beam (PBF-LB).

A further aspect of the disclosure involves a method for using the gas turbine engine case structure, the method comprising: flowing fuel through the injector to discharge from the fuel injector outlet as a fuel discharge stream; and flowing air through the support at least one passageway to discharge from the outlet opening as an air discharge stream; the fuel discharge stream meeting the air discharge stream; and combusting the discharged fuel.

A further aspect of the disclosure involves a gas turbine engine case structure comprising the unitary combination of: a case wall having an inner surface and an outer surface; a fuel injector protruding inward from the case wall and having an outlet; a splash plate having a first face and a second face, the fuel injector outlet facing the second face; and a support connecting the splash plate to the case wall and the fuel injector. The support comprises at least one passageway with an outlet opening between the splash plate and the injector.

In a further embodiment of any of the foregoing embodiments, additionally and/or alternatively: the support comprises a ligament section extending between the case wall and the splash plate and a gusset section between the ligament section and the fuel injector; and the at least one passageway passes through the gusset section but not through the ligament section.

A further aspect of the disclosure involves a gas turbine engine case structure comprising the unitary combination of: a case wall having an inner surface and an outer surface; a fuel injector protruding inward from the case wall and having an outlet; a splash plate having a first face and a second face, the fuel injector outlet facing the second face; and a support connecting the splash plate to the case wall and the fuel injector. The support comprises means for directing air to a gap between the splash plate and the injector.

In further embodiment of any of the foregoing embodiments, additionally and/or alternatively, the means comprises at least one passageway passes through the support.

The features of the embodiments above may be combined in any combination unless expressly indicated otherwise or technically infeasible.

The details of one or more embodiments are set forth in the accompanying drawings and the description below. Other features, objects, and advantages will be apparent from the description and drawings, and from the claims.

BRIEF DESCRIPTION OF THE DRAWINGS

Like reference numbers and designations in the various drawings indicate like elements.

DETAILED DESCRIPTION

As discussed further below, an injector splash plate support is provided with one or more passageways for directing air into the space between the injector orifice and splash plate in a direction to assist in discharge and distribution of the fuel deflected by the splash plate. The air introduction is generally transverse to the axis of fuel exiting the nozzle. The shear layer imposed by this air will enhance fuel atomization during operation. Better fuel atomization will result in less carbon build up within the combustor.

There is no appreciable increase in cost relative to a baseline because the amount of consolidated material and additive manufacture build time (e.g., in a powder bed fusion-laser beam (PBF-LB) system) is comparable to the baseline.

One or more longitudinal sections of the case or static structure may be unitarily formed as a full annulus or a circumferentially split structure. Thus, in one example discussed, a forward structure forming a compressor case 61 (FIG. 1) may largely be one single full annulus piece and an aft structure 63 forming a diffuser, combustor body, and turbine case may largely be a second piece 200 (FIG. 2) joined at a joint 65 such as a bolt circle at mating flanges. Such a single piece 200 may be additively manufactured such as via powder bed fusion-laser beam (PBF-LB), selective laser sintering (SLS), or directed energy deposition (DED). Example material is a nickel-based superalloy such as the Inconel family (e.g., Inconel 625). Nevertheless, features discussed below may be applied to split cases and may be applied to axially and/or radially less extensive pieces (e.g., wherein the combustor body (walls) and/or the diffuser are not part of the single piece).

Figure 2:
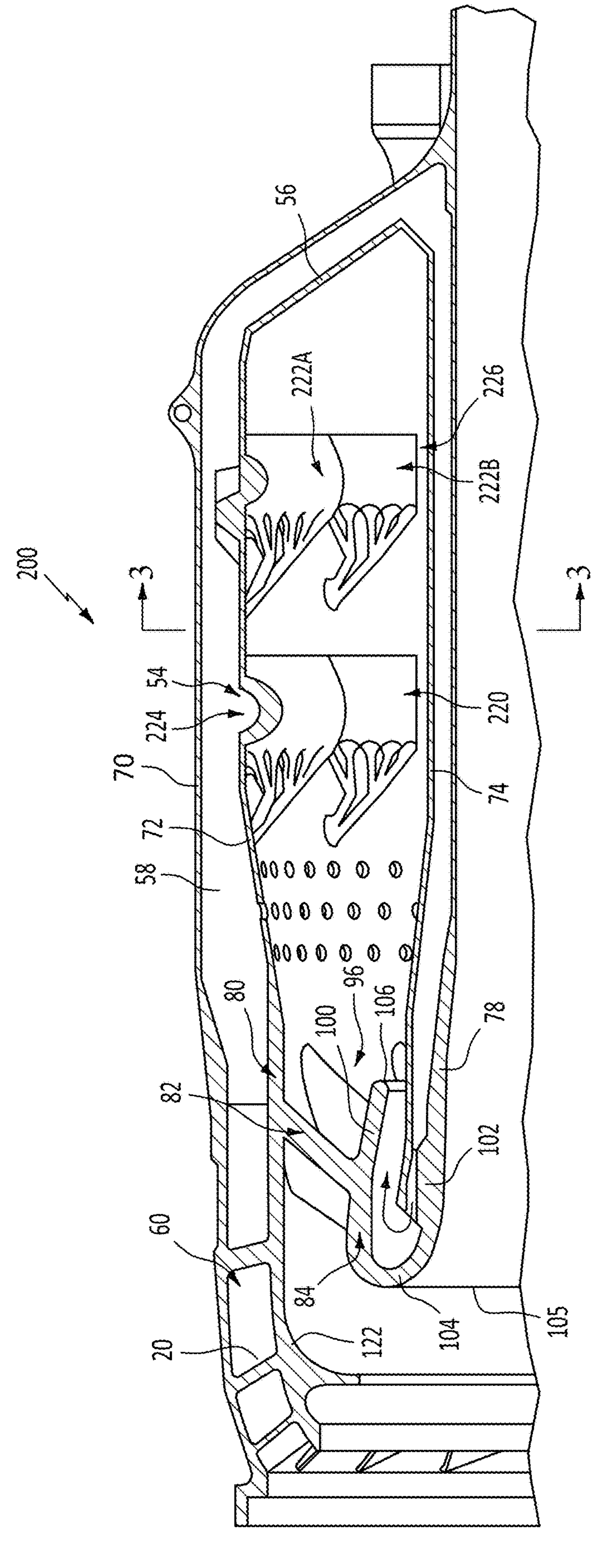
FIG. 2 is a view of a single-piece diffuser/combustor/turbine inlet nozzle body.

For use in a such a reverse flow combustor gas turbine engine, FIG. 2 shows such a second piece 200 including: the diffuser 60; combustor wall structures 56, 72, 74; combustor exit nozzle or turbine inlet vane ring 82; and turbine section wall structures 78. The nozzle 82 has a circumferential array of airfoils or vanes 96 extending radially from inboard ends at an inner platform 84 to outboard ends at an outer shroud or platform 80. In the reverse flow combustor situation, the airfoils 96 have upstream leading edges aft of forward trailing edges. The inner platform 84 is configured to provide the inside of a turn which turns the gaspath radially inward and back aft/rearward form the reverse flow combustor. Thus, the example inner platform 84 has a generally C-shaped central longitudinal section with a radially outer wall section 100 and, as portions of the turbine wall structure 78, a radially inner wall section 102 and a turn 104 (defining a forward rim 105) at a forward end of the inner platform 84. The outer wall thus extends forward/downstream from an aft/upstream leading edge or rim 106 to a forward junction with the turn 104. Similarly, the inner wall extends aft/downstream from a junction with the turn 104.

Figure 1:
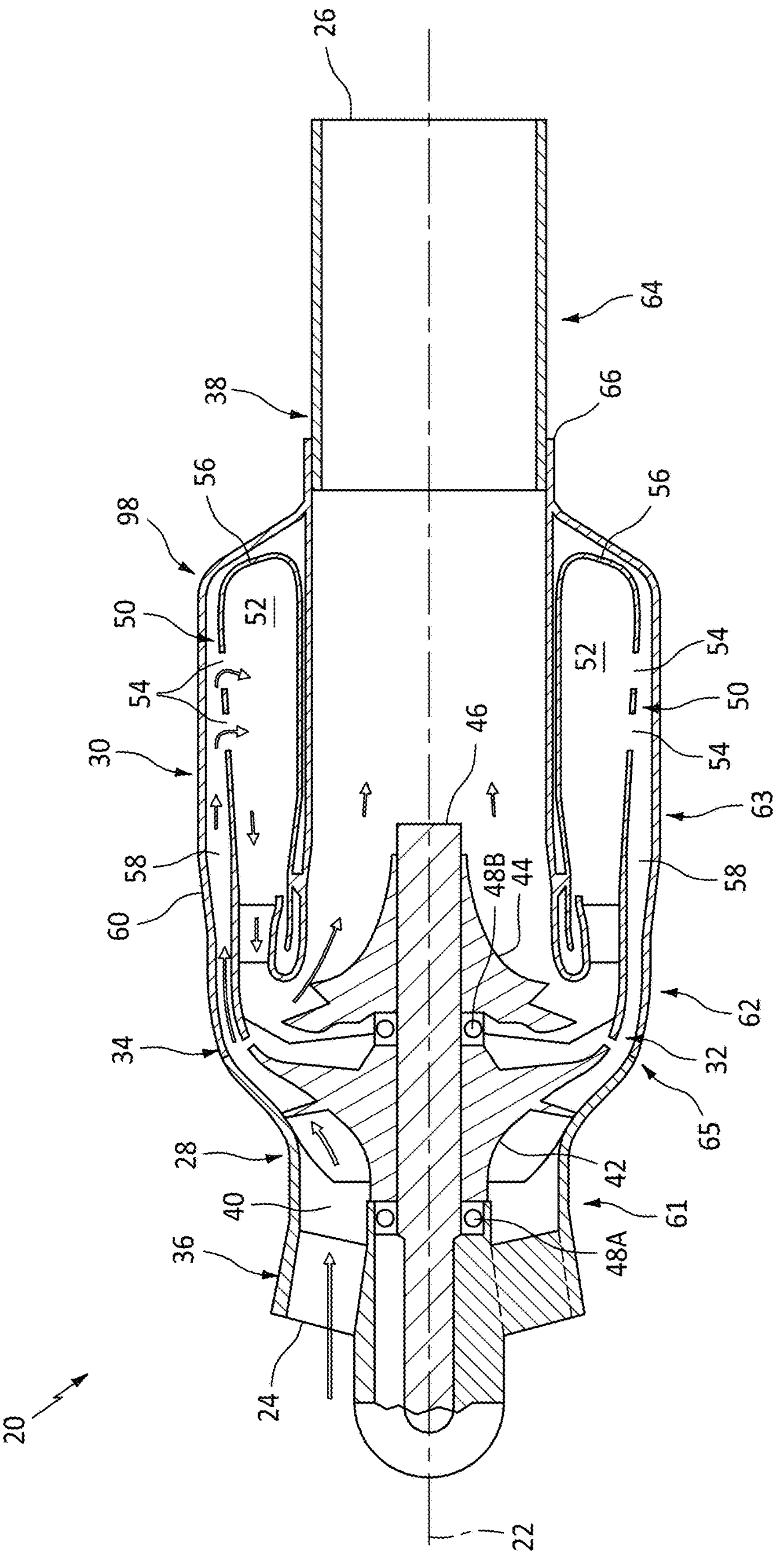
FIG. 1 is a schematic central longitudinal sectional view of a gas turbine engine.

FIG. 1 is a schematic central longitudinal sectional illustration of a gas turbine engine 20. The gas turbine engine 20 of FIG. 1 is configured as a single spool, radial-flow turbojet turbine engine. This gas turbine engine 20 is configured for propelling an aircraft such as, but not limited to, an unmanned aerial vehicle (UAV), a drone or any other manned or unmanned aircraft or self-propelled projectile. The present disclosure, however, is not limited to such an example turbojet turbine engine configuration nor to an aircraft propulsion system application. For example, the gas turbine engine 20 may alternatively be configured as a turboshaft, a turboprop, an auxiliary power unit (APU), and/or an industrial gas turbine.

The gas turbine engine 20 of FIG. 1 extends axially along an axial centerline 22 between a forward, upstream airflow inlet 24 and an aft, downstream exhaust 26. This axial centerline 22 may also be a rotational axis for various components within the gas turbine engine 20.

The gas turbine engine 20 includes a compressor section 28, a combustor section 30, and a turbine section 32. The gas turbine engine 20 also includes a static engine structure 34. This static engine structure 34 houses the compressor section 28, the combustor section 30, and the turbine section 32. The static engine structure 34 of FIG. 1 also forms an inlet section 36 and an exhaust section 38 for the gas turbine engine 20, where the inlet section 36 forms the airflow inlet 24 and the exhaust section 38 forms the exhaust 26.

The engine sections 36, 28, 30, 32 and 38 are arranged sequentially from upstream to downstream along a gaspath or core flowpath 40 that extends through the gas turbine engine 20 from the airflow inlet 24 to the exhaust 26. Each of the engine sections 28 and 32 includes a respective rotor 42 and 44. The example rotors are co-spooled to rotate as a unit. Each of these rotors 42, 44 includes a plurality of rotor blades arranged circumferentially around and connected to at least one respective rotor hub (for centrifugal or disk for axial). The rotor blades, for example, may be formed integral with or mechanically fastened, welded, brazed, adhered and/or otherwise attached to the respective rotor disk(s).

The compressor rotor 42 may be configured as a centrifugal/radial flow rotor. The turbine rotor 44 may also be configured as a radial flow rotor. The compressor rotor 42 is connected to the turbine rotor 44 through a shaft 46. This shaft 46 is rotatably supported by the static engine structure 34 through a plurality of bearings 48A and 48B (generally referred to as 48); e.g., rolling element bearings, journal bearings, etc.

The combustor section 30 includes an example annular combustor 50 with an annular combustion chamber 52. The combustor 50 of FIG. 2 is configured as a reverse flow combustor. Inlets ports 54 (formed at dilution chutes discussed below) into the combustion chamber 52, for example, may be arranged at (e.g., on, adjacent or proximate) and/or towards an aft bulkhead wall 56 of the combustor 50. An outlet from the combustor 50 may be arranged axially aft of an inlet to the turbine section 32. The combustor 50 may also be arranged radially outboard of and/or axially overlap at least a (e.g., aft) portion of the turbine section 32. With this arrangement, the core flowpath 40 of FIG. 1 reverses direction (e.g., from a forward-to-aft direction to an aft-to-forward direction) a first time as the flowpath 40 extends from a diffuser plenum 58 surrounding the combustor 50 into the combustion chamber 52. The core flowpath 40 of FIG. 1 then reverses direction (e.g., from the aft-to-forward direction to the forward-to-aft direction) a second time as the flowpath 40 extends from the combustion chamber 52 into the turbine section 32.

During operation, air enters the gas turbine engine 20 through the inlet section 36 and its airflow inlet 24. The inlet section 36 directs this air from the airflow inlet 24 into the core flowpath 40 and the compressor section 28. The airflow inlet 24 of FIG. 1 thereby forms a forward, upstream inlet to the core flowpath 40 and the compressor section 28. The air within the core flowpath 40 may be referred to as core air.

The core air is compressed by the compressor rotor 42 and directed through a diffuser 60 and its plenum 58 into the combustion chamber 52. Fuel is injected and mixed with the compressed core air to provide a fuel-air mixture. This fuel-air mixture is ignited within the combustion chamber 52, and combustion products thereof flow through the turbine section 32 and cause the turbine rotor 44 to rotate. This rotation of the turbine rotor 44 drives rotation of the compressor rotor 42 and, thus, compression of the air received from the airflow inlet 24. The exhaust section 38 receives the combustion products from the turbine section 32. The exhaust section 38 directs the received combustion products out of the gas turbine engine 20 to provide forward engine thrust.

The static engine structure 34 of FIG. 1 may include some or all static engine components included in the gas turbine engine 20. Herein, the term "static" may describe a component that does not rotate with the rotating assembly or spool (e.g., an assembly of the rotors 42 and 44 and the shaft 46) during gas turbine engine operation. A static component, for example, may refer to any component that remains stationary during gas turbine engine operation such as, but not limited to, a wall, a liner, a strut, a fixed vane, a fuel nozzle, a conduit, etc. The static engine structure 34 of FIG. 1, for example, includes a forward, case structure 62 and an aft, exhaust duct structure 64.

Figure 1A:
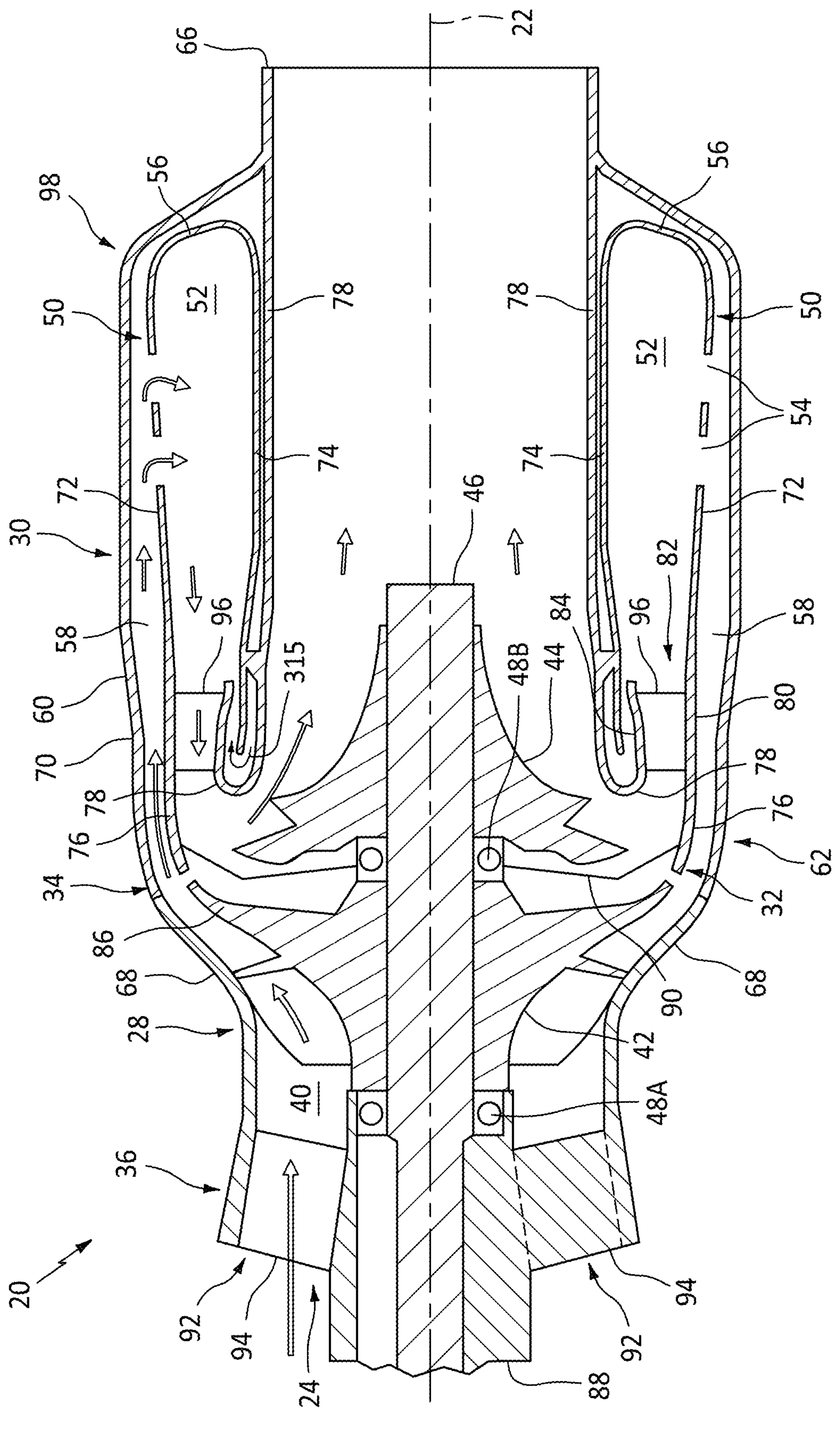
FIG. 1A is an enlarged view of a portion of the engine of FIG. 1.

The example case structure 62 of FIG. 1A is configured as a generally tubular structure formed in two general sections: an inlet/compressor case 61; and a diffuser/combustor/turbine case 63. The case structure 62, for example, extends axially along the axial centerline 22 from the forward airflow inlet 24 to an outlet 66 from the turbine section 32. The case structure 62 also extends circumferentially about (e.g., completely around) the axial centerline 22 such that the case structure 62 has, for example, a full hoop geometry. The two sections 61, 63 may be secured to each other at a bolt flange joint 65.

The case structure 62 includes one or more case walls. The inlet/compressor case 61 of FIG. 2A, for example, includes a compressor wall 68. The diffuser/combustor/turbine case 63 and its FIG. 2 main piece 200 have a diffuser wall 70, an outer combustor wall 72 of the combustor 50, an inner combustor wall 74 of the combustor 50, the bulkhead wall 56 of the combustor 50, an outer turbine wall 76 and an inner turbine wall 78. Each of these case walls 56, 68, 70, 72, 74, 76 and/or 78 may be generally tubular or generally annular. Each of the case walls 68, 70, 72, 74, 76, 78 of FIG. 1A, for example, is tubular, and the bulkhead wall 56 is annular.

The compressor wall 68 extends axially along the axial centerline 22 between and is connected to the inlet section 36 and the diffuser wall 70. The compressor wall 68 of FIG. 2A circumscribes, axially overlaps and thereby houses the compressor rotor 42.

The diffuser wall 70 extends axially along the axial centerline 22 between and is connected to the compressor wall 68 and an aft end portion of the inner turbine wall 78. The diffuser wall 70 is spaced/displaced radially outboard from and axially overlaps the combustor 50. The diffuser wall 70 of FIG. 1A thereby forms an outer peripheral boundary of the diffuser plenum 58 that surrounds the combustor 50 and the combustor wall 72 locally forms an inner boundary. FIG. 2 also shows diffuser vanes 120 radially between a forward portion of the diffuser wall 70 and an inner wall 122 that merges with the outer platform 80 which, in turn, merges with the combustor outer wall 72.

The outer combustor wall 72 extends axially along the axial centerline 22 between and may be connected to the bulkhead wall 56 and an outer platform 80 of an exit nozzle or turbine inlet vane ring 82 from the combustion chamber 52. The inner combustor wall 74 is circumscribed and axially overlapped by the outer combustor wall 72. The inner combustor wall 74 extends axially along the axial centerline 22 between and may be connected to the bulkhead wall 56 and an inner platform 84 of the exit nozzle 82. The bulkhead wall 56 extends radially between and is connected to aft end portions of the outer combustor wall 72 and the inner combustor wall 74. The case walls 56, 72 and 74 may thereby collectively form peripheral boundaries of the combustion chamber 52 therebetween.

The outer turbine wall 76 may be connected to the exit nozzle outer platform 80. The outer turbine wall 76 projects axially out from the exit nozzle outer platform 80 and extends axially towards/to an aft, downstream end of an inner platform or hub 86 of the compressor rotor 42. This outer turbine wall 76 is circumscribed and axially overlapped by the diffuser wall 70. The outer turbine wall 76 of FIG. 1A may thereby form an inner peripheral boundary of the core flowpath 40 within the diffuser 60, and may form an outer peripheral boundary of the core flowpath 40 within a (e.g., upstream) portion of the turbine section 32. The outer turbine wall 76 of FIG. 1A also circumscribes, axially overlaps and thereby houses a (e.g., upstream) portion of the turbine rotor 44.

The inner turbine wall 78 may be connected to the exit nozzle inner platform 84. An upstream portion of the inner turbine wall 78 projects axially (in the aft-to-forward direction) out from the exit nozzle inner platform 84 to a turning portion of the inner turbine wall 78. A downstream portion of the inner turbine wall 78 projects axially (in the forward-to-aft direction) away from the inner turbine wall turning portion to the turbine section outlet 66. The inner turbine wall 78 is circumscribed and axially overlapped by the combustor 50. The inner turbine wall 78 is also spaced/displaced radially inboard from the combustor 50. The inner turbine wall 78 of FIG. 1A thereby forms an inner peripheral boundary of the diffuser plenum 58 that surrounds the combustor 50. The inner turbine wall 78 forms an outer peripheral boundary of the core flowpath 40 within a (e.g., downstream) portion of the turbine section 32. The inner turbine wall 78 also circumscribes, axially overlaps and thereby houses a (e.g., downstream) portion of the turbine rotor 44.

The static engine structure 34 may also include one or more internal support structures with one or more support members. Examples of support members include, but are not limited to, struts, structural guide vanes, bearing supports, bearing compartment walls, etc. The static engine structure 34 of FIG. 1A, for example, includes a forward support structure 88, an aft support structure 90, an inlet nozzle 92 and the exit nozzle 82. The forward support structure 88 and the inlet nozzle 92 may be configured together. The forward support structure 88 may be configured to support the forward bearing 48A. The aft support structure 90 may be configured to support the aft bearing 48B. The inlet nozzle 92 may be configured to condition the core air entering the compressor section 28. The inlet nozzle 92, for example, may include one or more guide vanes 94 which impart swirl to the core air. The exit nozzle 82 may similarly be configured to condition the combustion products exiting the combustor section 30. The exit nozzle 82, for example, may include one or more guide vanes 96 which import swirl to the combustion products, where these guide vanes 96 are connected to and extend radially between the exit nozzle inner and outer platforms 84 and 80. The static engine structure 34, of course, may also or alternative include various other static stationary gas turbine engine components.

As discussed above, in an example engine having a reverse flow combustor, an example HPT vane has an outer diameter shroud and an inner diameter platform. The example platform is of generally c-shaped central longitudinal section, having: an outer diameter wall at inner diameter ends of the airfoils; an inner diameter wall spaced radially inward thereof; and forward turn joining those walls. The outer diameter wall generally forms an inner diameter boundary of the gaspath exiting the combustor; the platform turn then forms the inside/aft boundary of a turn of the gaspath radially inward toward the turbine inlet; and the inner diameter wall then forms the outer diameter boundary of the gaspath at or near the turbine section outlet.

Figure 3:
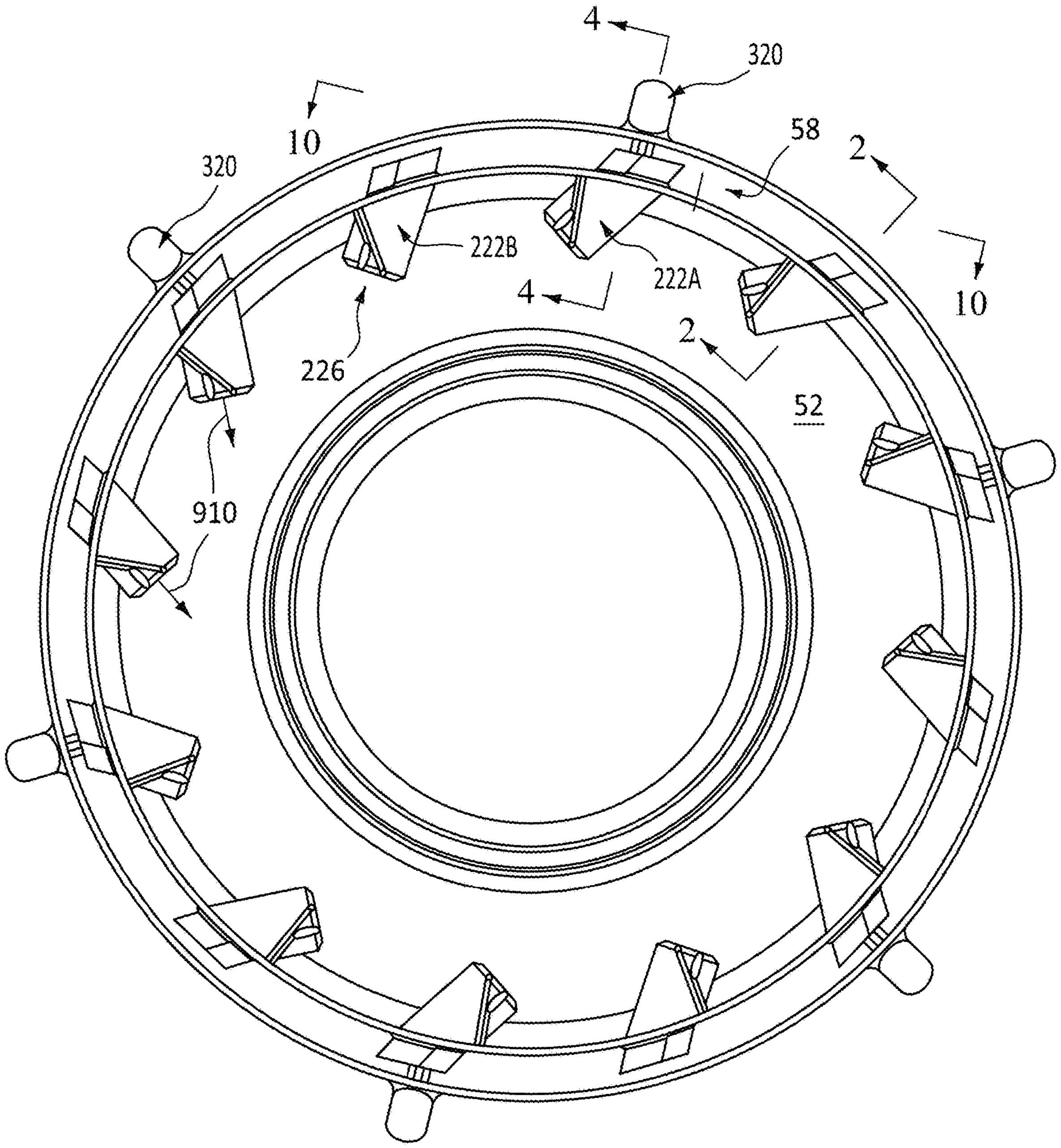
FIG. 3 is a transverse sectional view of the body of FIG. 2, taken along line 3-3.

FIG. 2 shows a forward circumferential array of dilution chutes/flow tubes 220 and an aft circumferential array of dilution chutes/flow tubes 222A/222B. The dilution chutes have outer diameter inlets along the wall structure 72 which forms an inner diameter wall of the diffuser plenum 58 and an outer diameter wall of the combustor combustion chamber 52 and inner diameter outlets 226 in the combustion chamber 52/combustor interior. Given the reverse flow nature, the forward array inlets are upstream of the aft array inlets and the forward array outlets are downstream of the aft array outlets. The dilution chutes introduce air (airflow 910 of FIG. 3) from the diffuser plenum 58 into the combustion chamber 52 to provide a tangential swirl component to that airflow in the combustion chamber 52. The orientation providing that tangential swirl is seen, for example, in FIG. 3.

The example forward array dilution chutes all exclusively introduce air. The aft array dilution chutes are divided into two groups alternating with each other. One group 222B introduces only air and the other group 222A is associated with fuel injectors to inject fuel (fuel jet 950 of FIG. 4A) into their introduced air 910.

Figure 4:
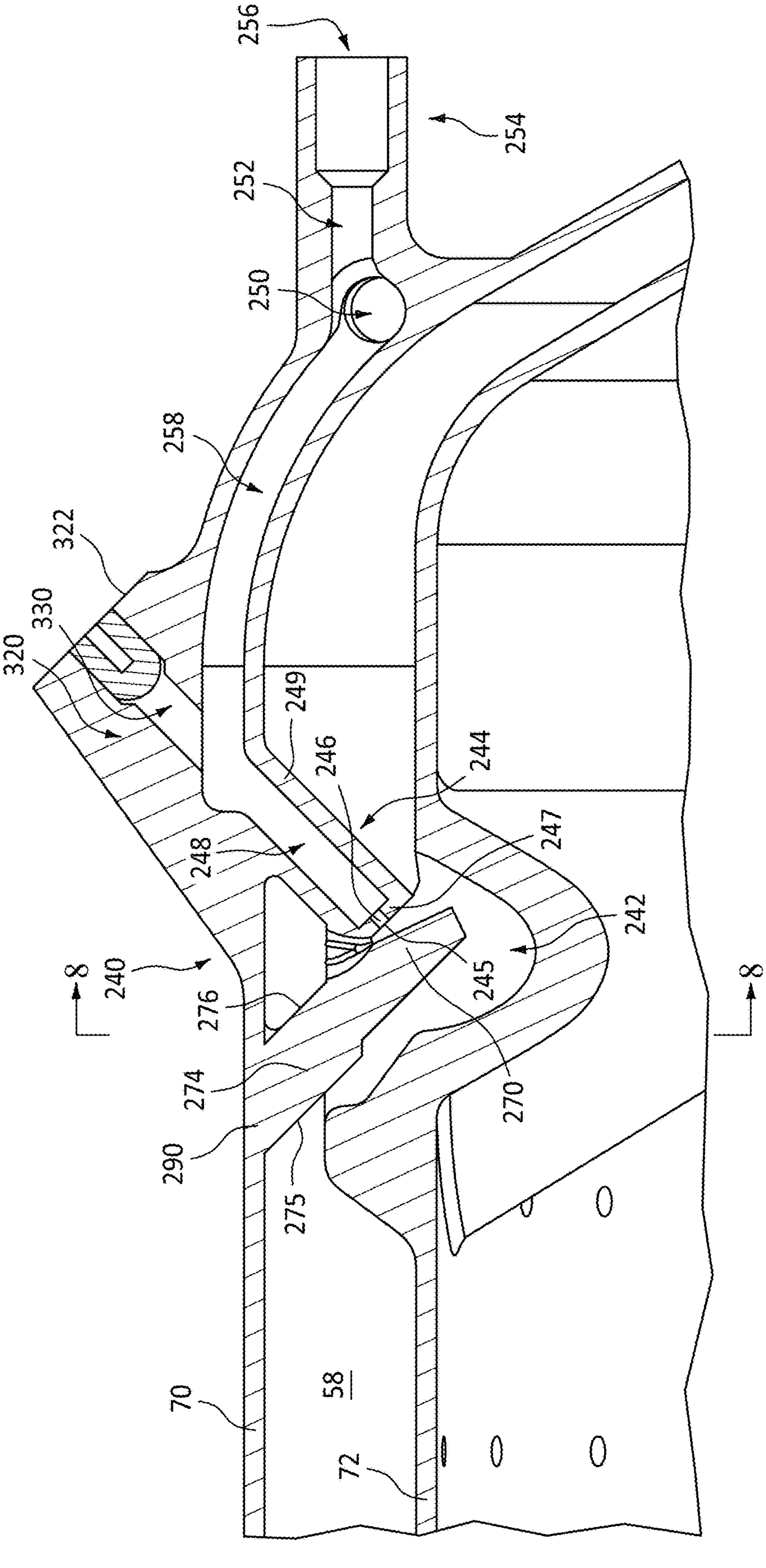
FIG. 4 is a central longitudinal sectional view of the body taken along line 4-4 of FIG. 3.

FIG. 4 shows a fuel injector and atomizer unit 240 for introducing fuel to the interior 242 of one of the aft dilution chutes 222A. The unit 240 comprises an injector 244 having an outlet 245 of an orifice 246 in a distal end wall 247 and fed by a passageway 248 within the injector. The injector also has a sidewall 249. Each of the nozzles is fed, in the example system, from an annular inlet plenum 250 having a single inlet passageway 252 from a single fuel fitting 254 having an inlet 256. For each individual injector, a respective passageway leg 258 extends from the plenum 250 to merge with the passageway 248. The injector 244 thus extends at least partially across the diffuser plenum 58.

Figure 4A:
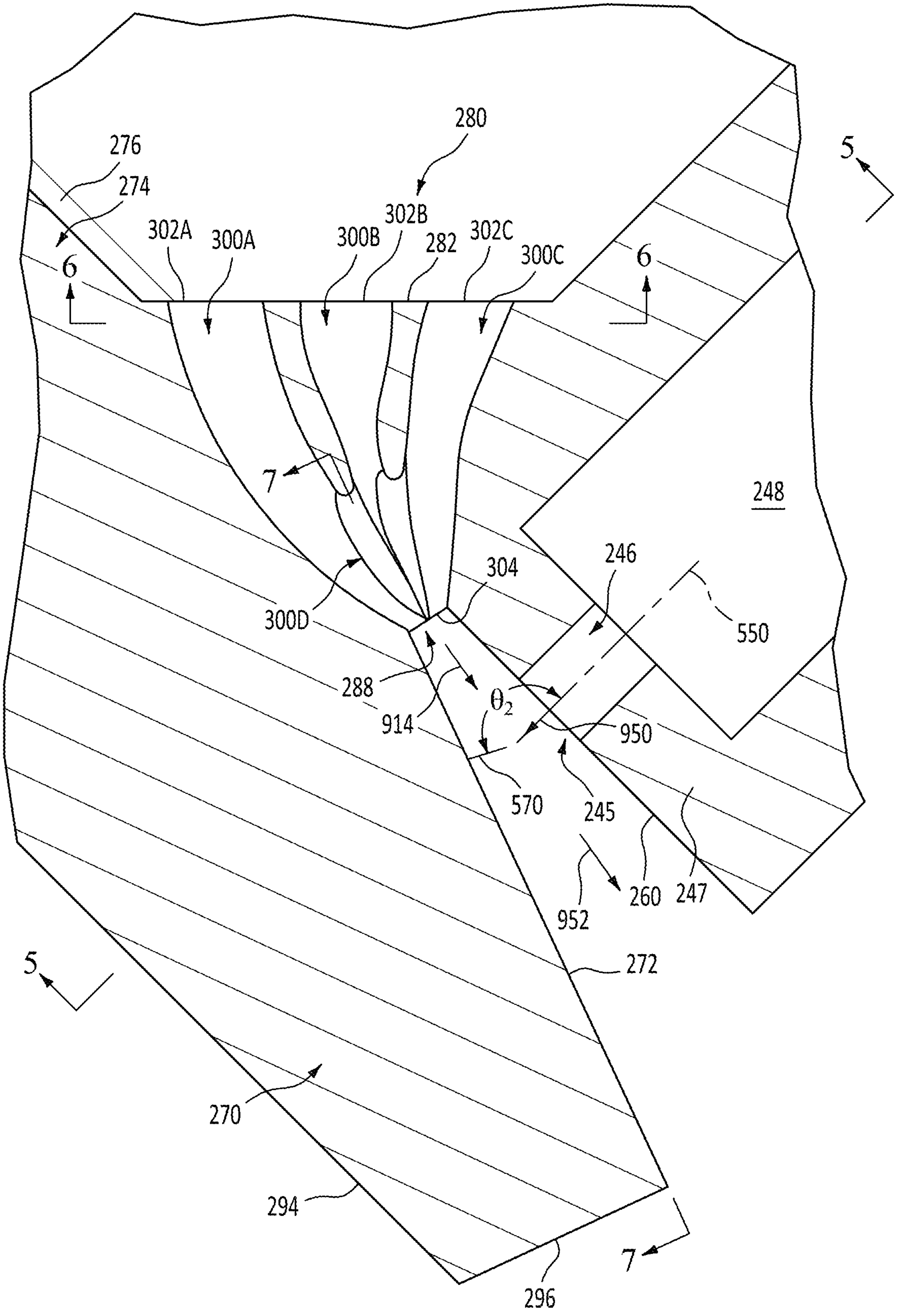
FIG. 4A is an enlarged view of a nozzle outlet and splash plate of FIG. 4.
Figure 5:
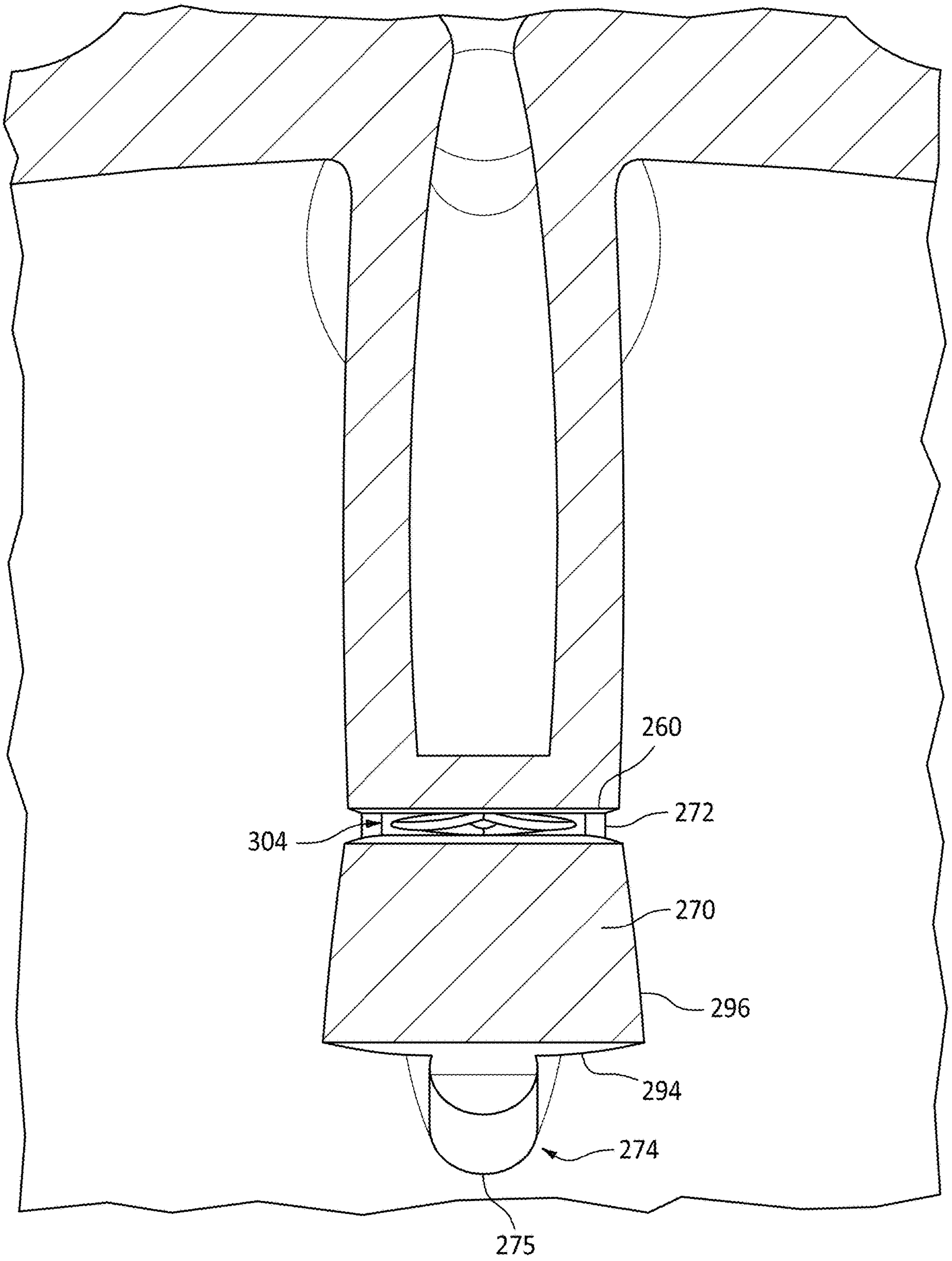
FIG. 5 is a sectional view of the injector and splash plate taken along line 5-5 of FIG. 4A.
Figure 6:
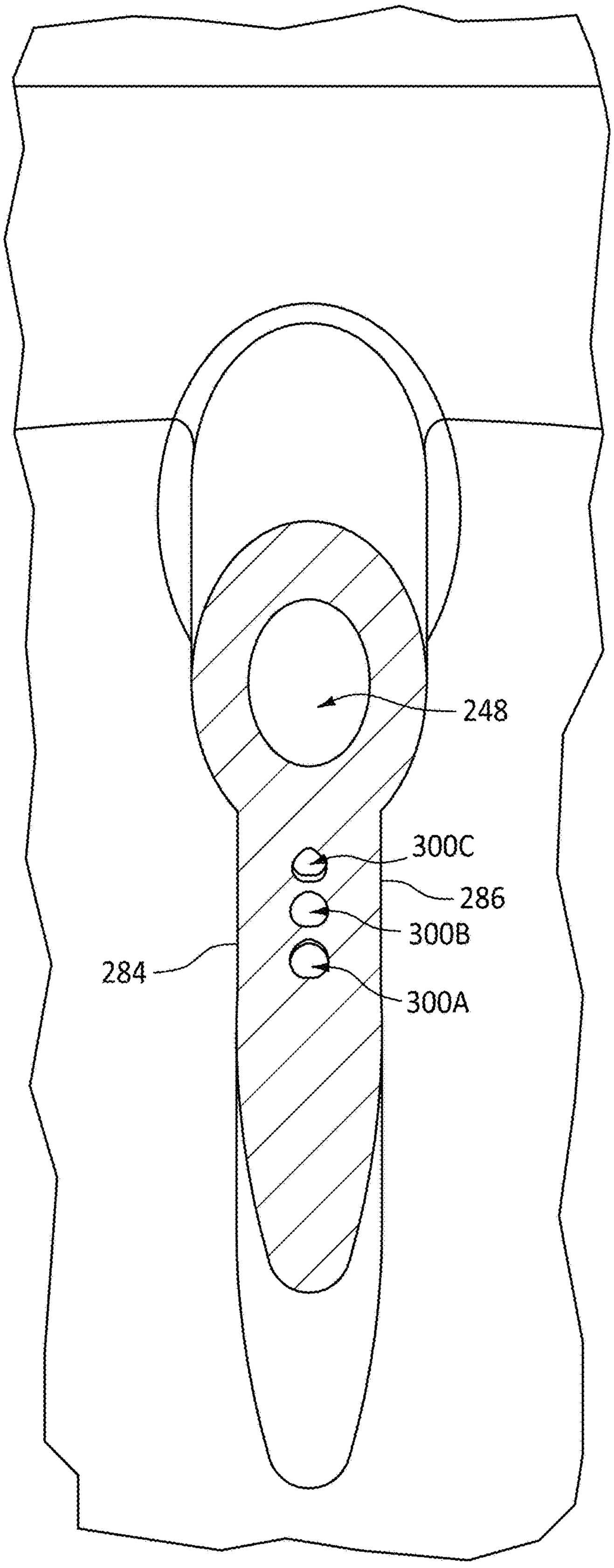
FIG. 6 is a sectional view of the injector and splash plate taken along line 6-6 of FIG. 4A.
Figure 7:
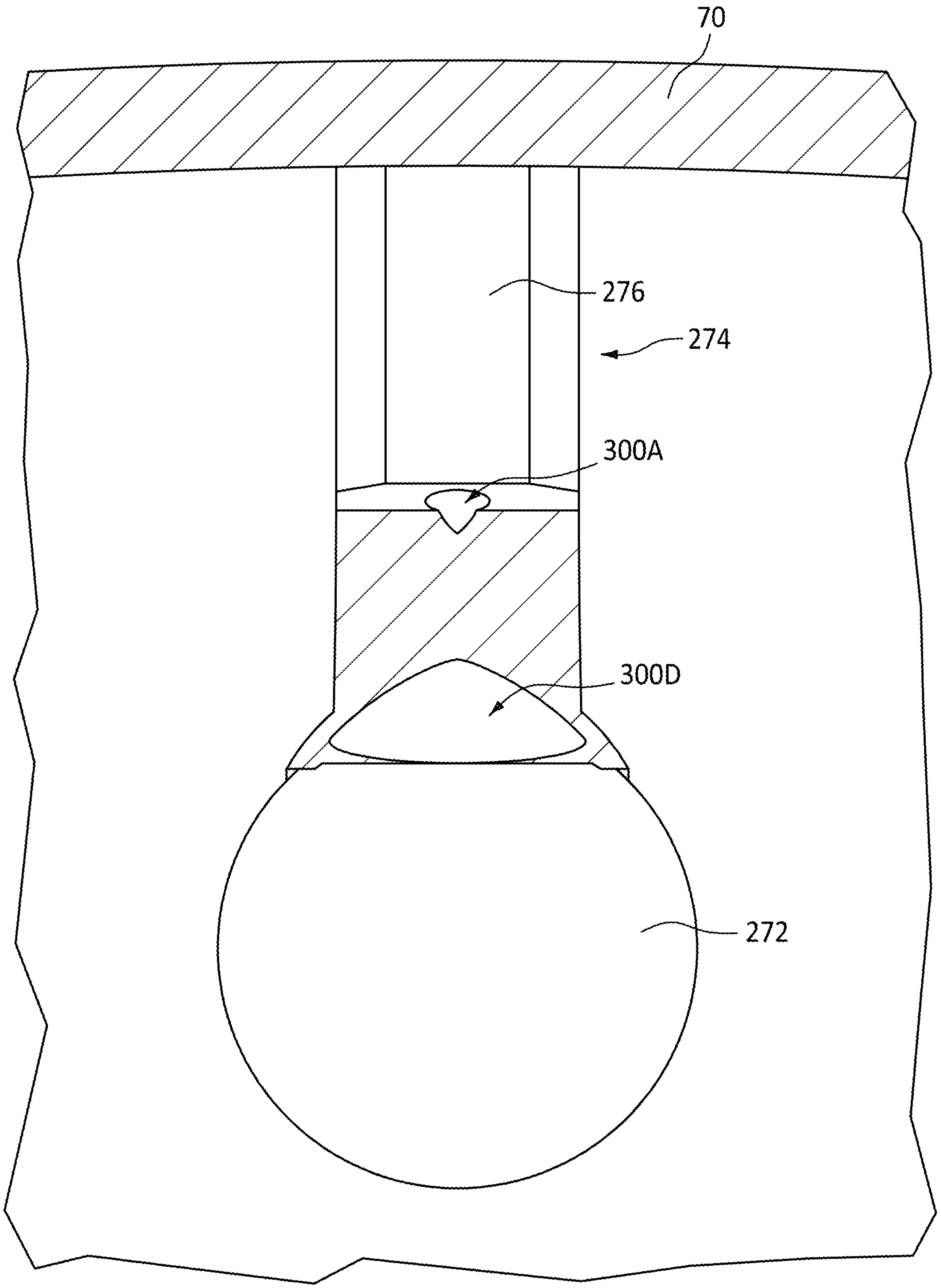
FIG. 7 is a sectional view of the injector and splash plate taken along line 7-7 of FIG. 4A.
Figure 8:
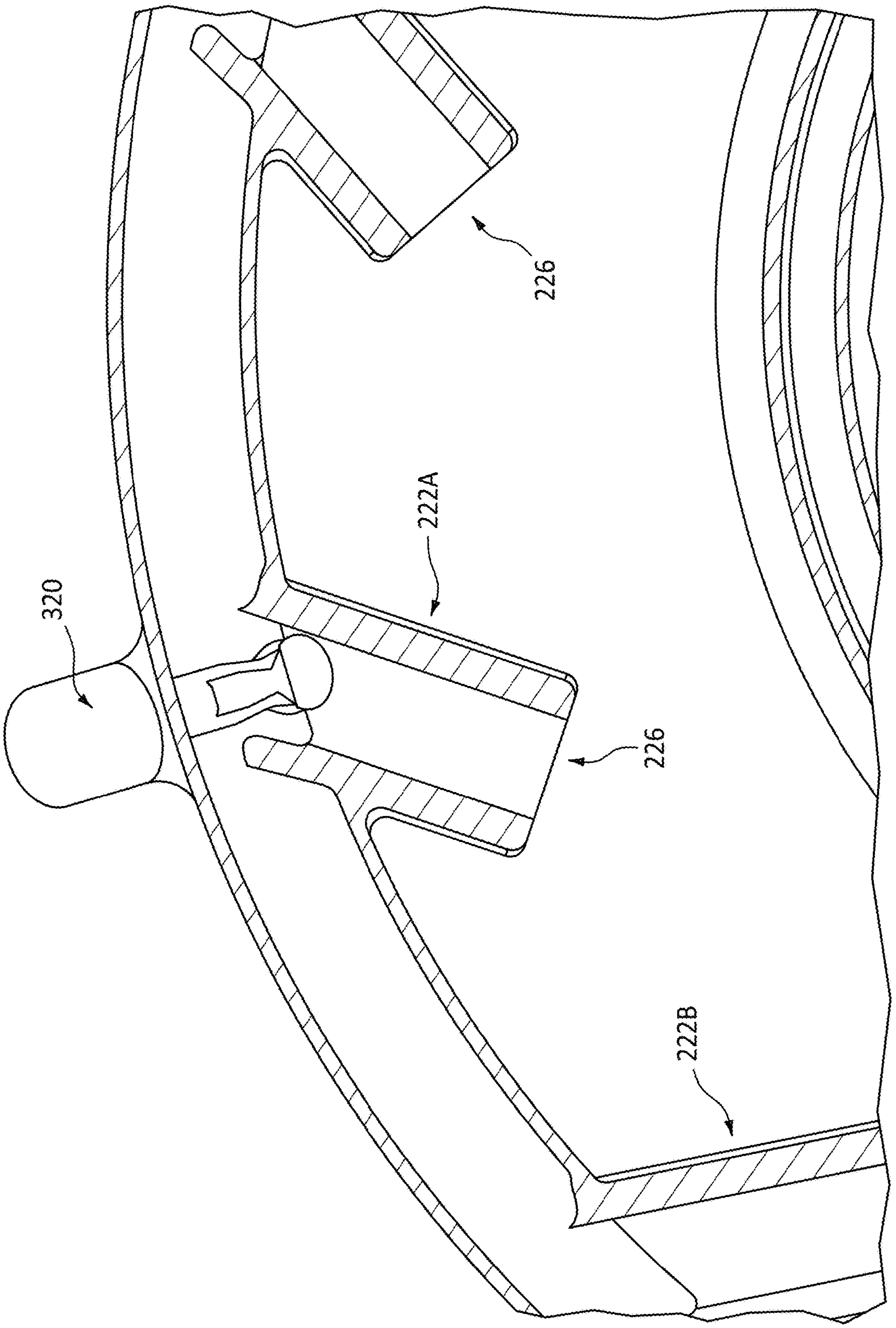
FIG. 8 is a transverse sectional view of the body taken along line 8-8 of FIG. 4.
Figure 9:
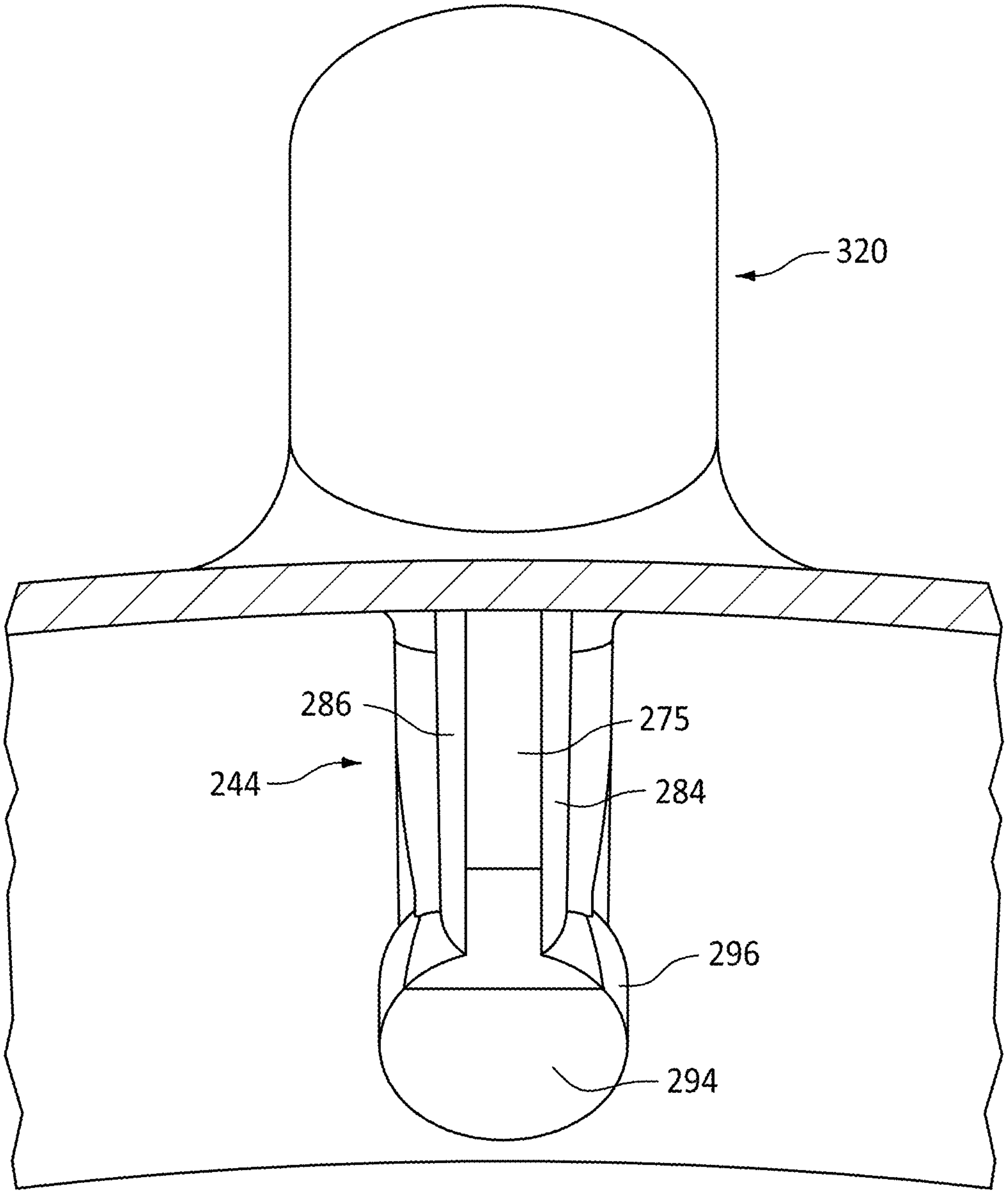
FIG. 9 is a sectional view taken along line 9-9 of FIG. 4 while suppressing/hiding a dilution chute.
Figure 10:
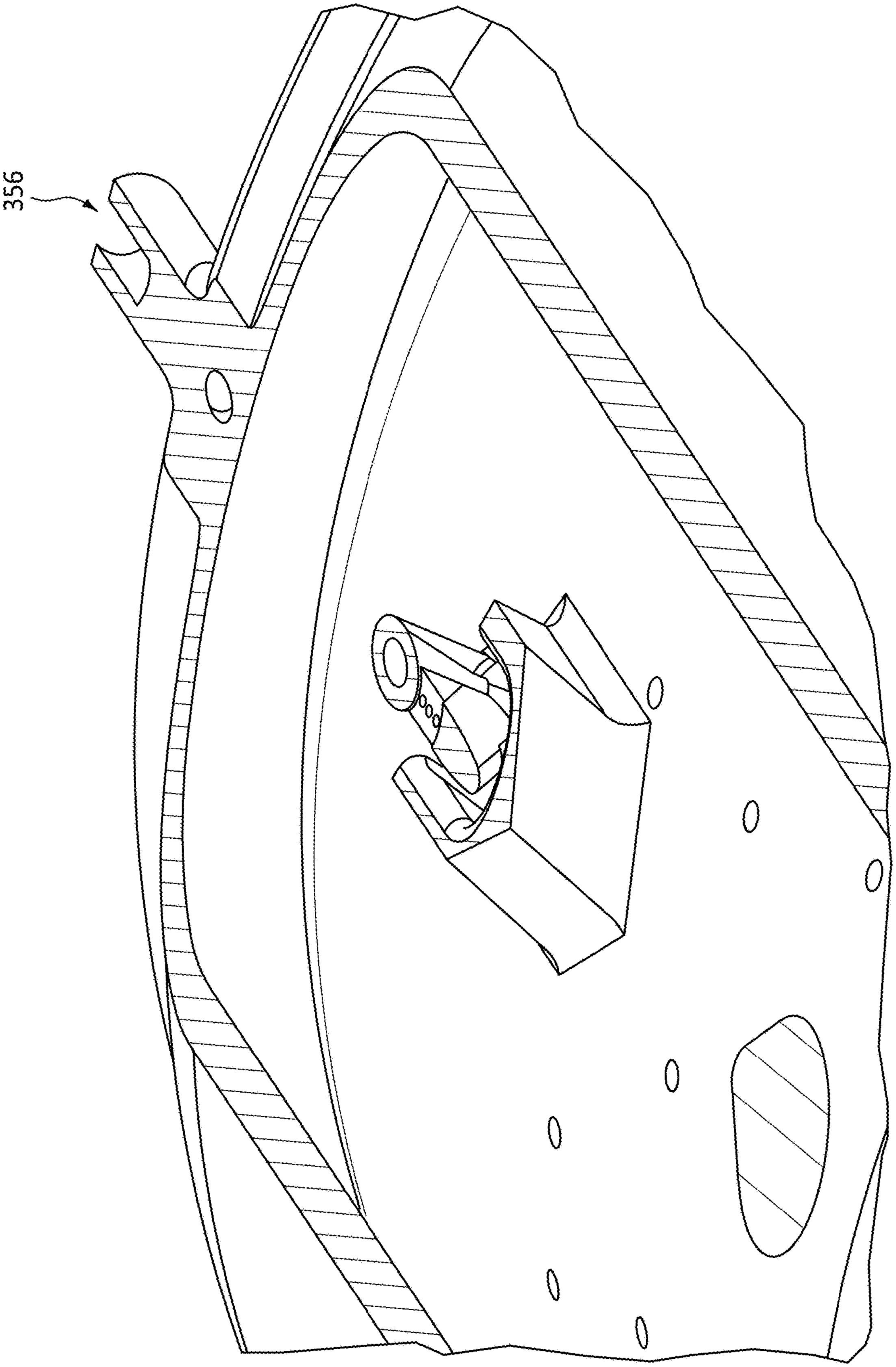
FIG. 10 is a cutaway view of the body taken along line 10-10 of FIG. 3.
Figure 11:
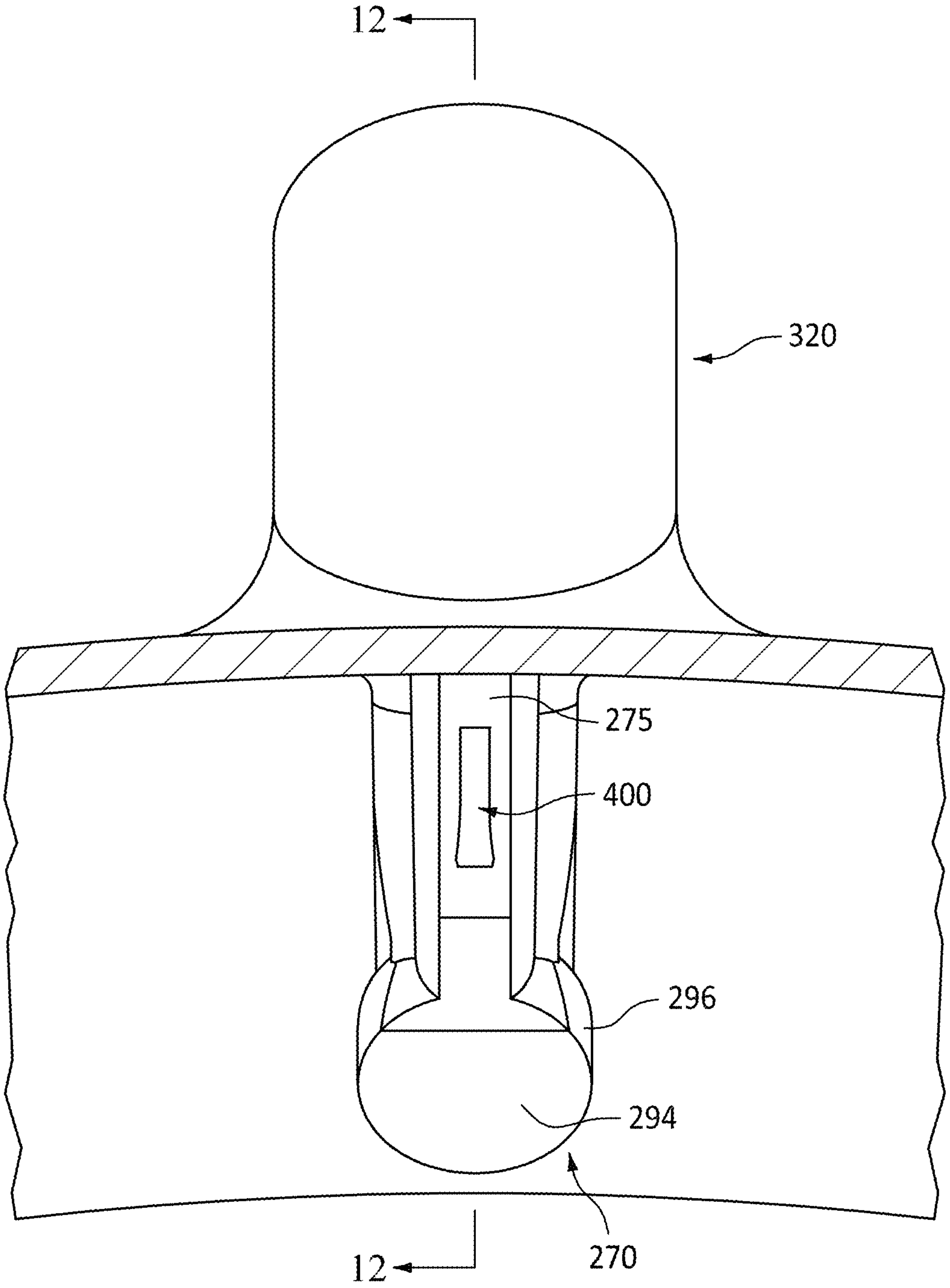
FIG. 11 is a partial view of a front view of an alternate injector and splash plate.
Figure 12:
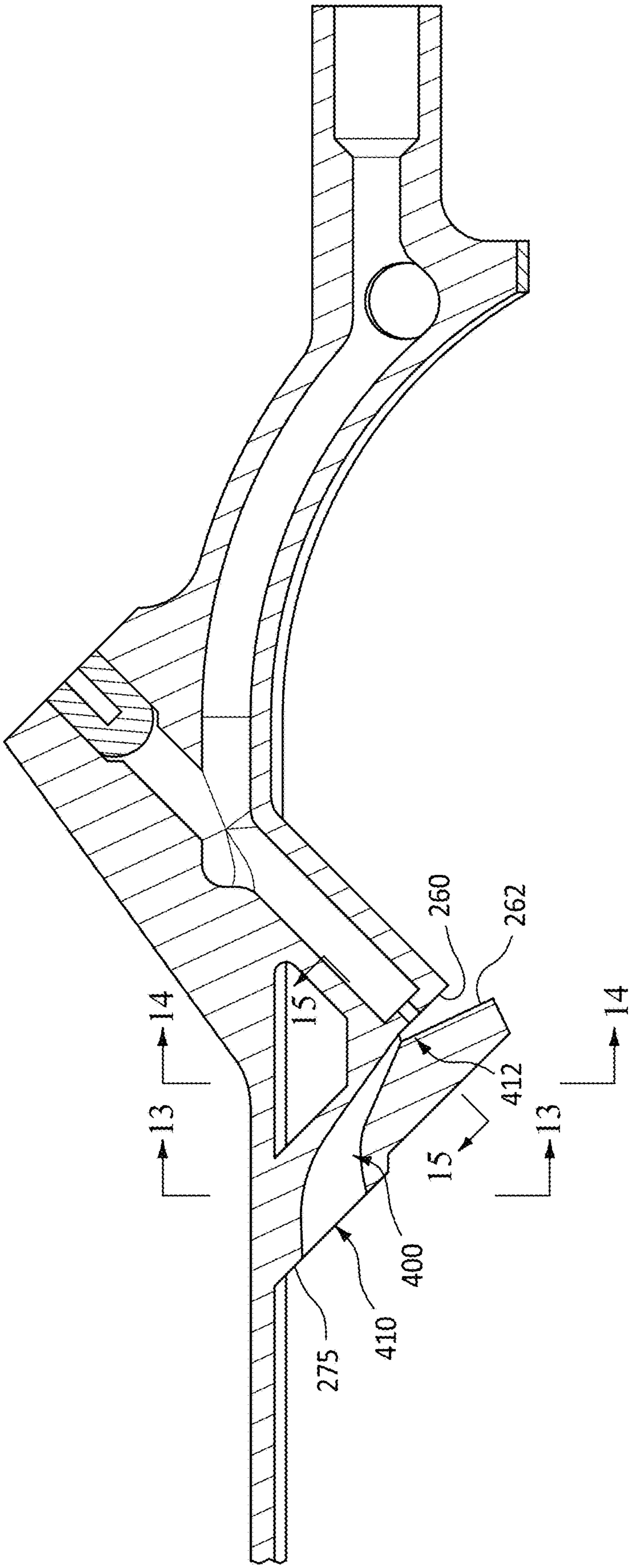
FIG. 12 is a partial central longitudinal sectional view of a body including the alternate injector and splash plate.

Each injector also includes a splash plate 270 (FIG. 4A) having an aft face 272 facing the nozzle outlet 245 and a distal end face 260 of the injector (an outer face of the end wall 247). For structural support of the nozzle and splash plate, the splash plate is at the distal end of a radially inward- and axially aft-extending web of ligament 274 extending inward from the diffuser wall 70. The support structure further includes a gusset 280 joining the ligament 274 to the nozzle. The gusset has an outer diameter (OD) surface 282 and respective circumferential/lateral surfaces 284, 286 (FIG. 6). The gusset has an inner diameter end 288 spanning between the distal end face 249 of the nozzle and the aft face 272 of the splash plate. As noted above, the gusset structurally couples the ligament 274 to the injector. FIG. 5 shows the ligament with a forward/leading end/edge 275 and an aft/trailing end/edge 276. First and second circumferential sides 277 and 278 are seen in FIG. 6. An outer diameter (OD)/proximal end 290 is at the wall 70 and a distal/inner diameter (ID) end 292 is at the splash plate. The example splash plate is of generally circular planform and has a forward face 294 and a lateral face 296 joining the forward face 294 to the aft face 272.

For introducing an additional flow 914 (FIG. 4) of air to the gap or space between the nozzle outlet 947/distal end 960 and splash plate aft face 272, the example gusset includes passageways 300A, 300B, 300C having respective fore-to-aft arrayed inlets 302A, 302B, 302C along the outer diameter edge 282 of the gusset. The example inlets are generally circular shape but the passageways converge axially and diverge laterally and merge into a trunk section 300D extending to an outlet 304 to/facing the gap (e.g., at a vertex thereof). FIG. 4A shows a central axis 550 of the nozzle and its outlet and a surface normal 570 of the surface 272. These form an outward angle $\theta_2$ which is slightly less than 180° (e.g., about 160° or 145° to 170°).

The outlet 304 is thus transversely elongate (FIG. 5) so that the air 914 at discharge is diffused along the surface 272 and merges with the fuel discharge flow 950 to form a fanning mixed flow 952 further atomizing the fuel.

As an artifact of manufacture, FIG. 4 shows each fuel injector as associated with a radially outwardly protruding boss 320 with a distal end 322. The boss accommodates the intersection of the passageways 248 and 258 but also provides machining access. In an example implementation, the boss is shown having an outboard/outer passageway or hole 330 coaxial with the passageway 248 and itself having an outboard portion plugged with a plug 332. An example plug is an externally threaded plug in an internally threaded bore. In the example implementation, the as-manufactured single-piece structure does not include the nozzle orifice 246 or the outboard passageway 330. The outboard passageway 330 is drilled and counterbored and threaded to accommodate the plug. The drilled passageway provides machining access to precision machine (e.g., drill) the nozzle orifice 246. For example, with laser machining, the laser beam may pass through the originally-manufactured passageway 248 and the outboard passageway 330. In an EDM situation, the EDM electrode and optionally some additional portion of the tool may pass through such passageways to machine the orifice 246. After the machining, the outboard passageway may be plugged as noted above.

Figure 13:
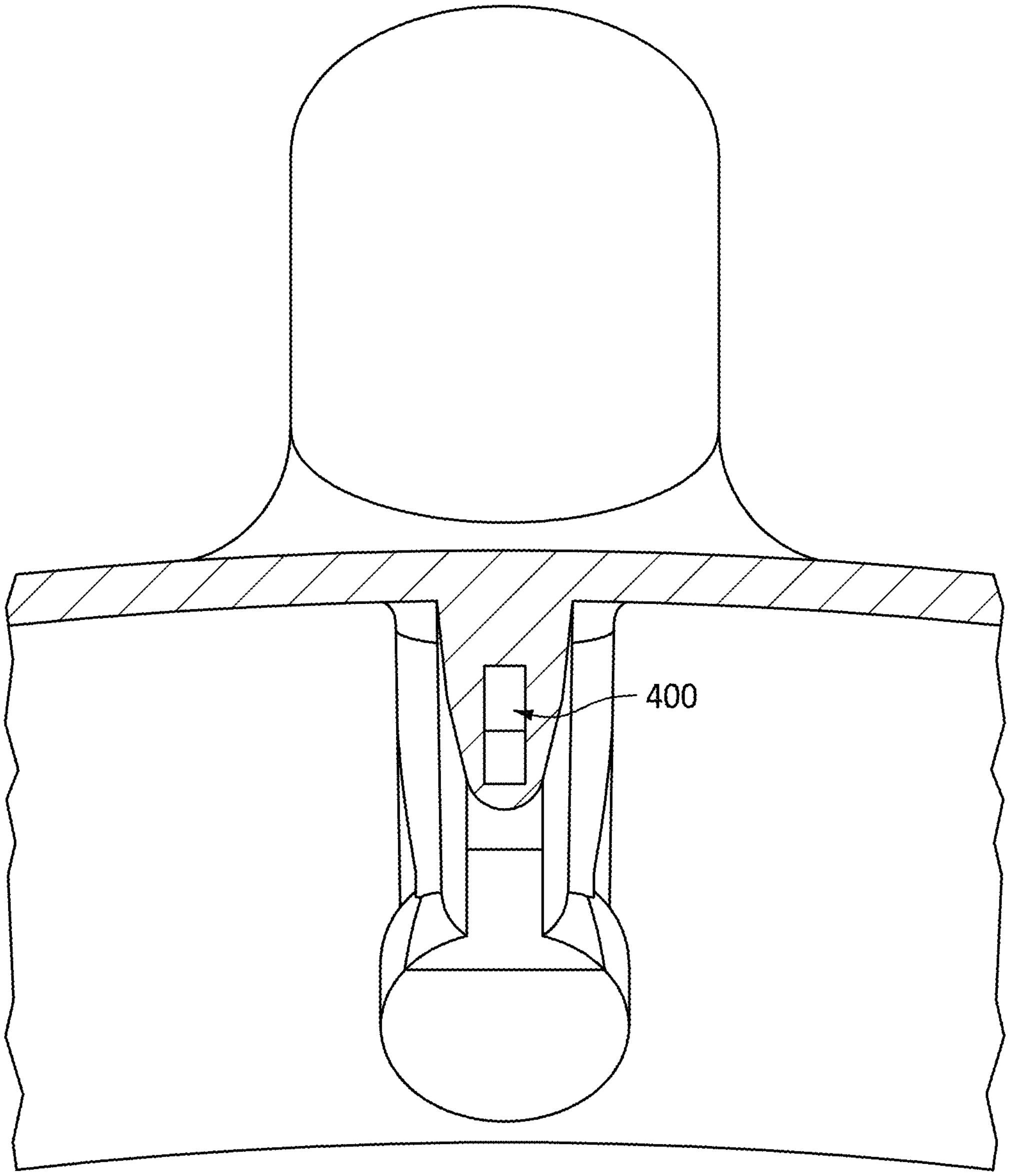
FIG. 13 is a transverse sectional view of the alternate injector and splash plate taken along line 13-13 of FIG. 12.
Figure 14:
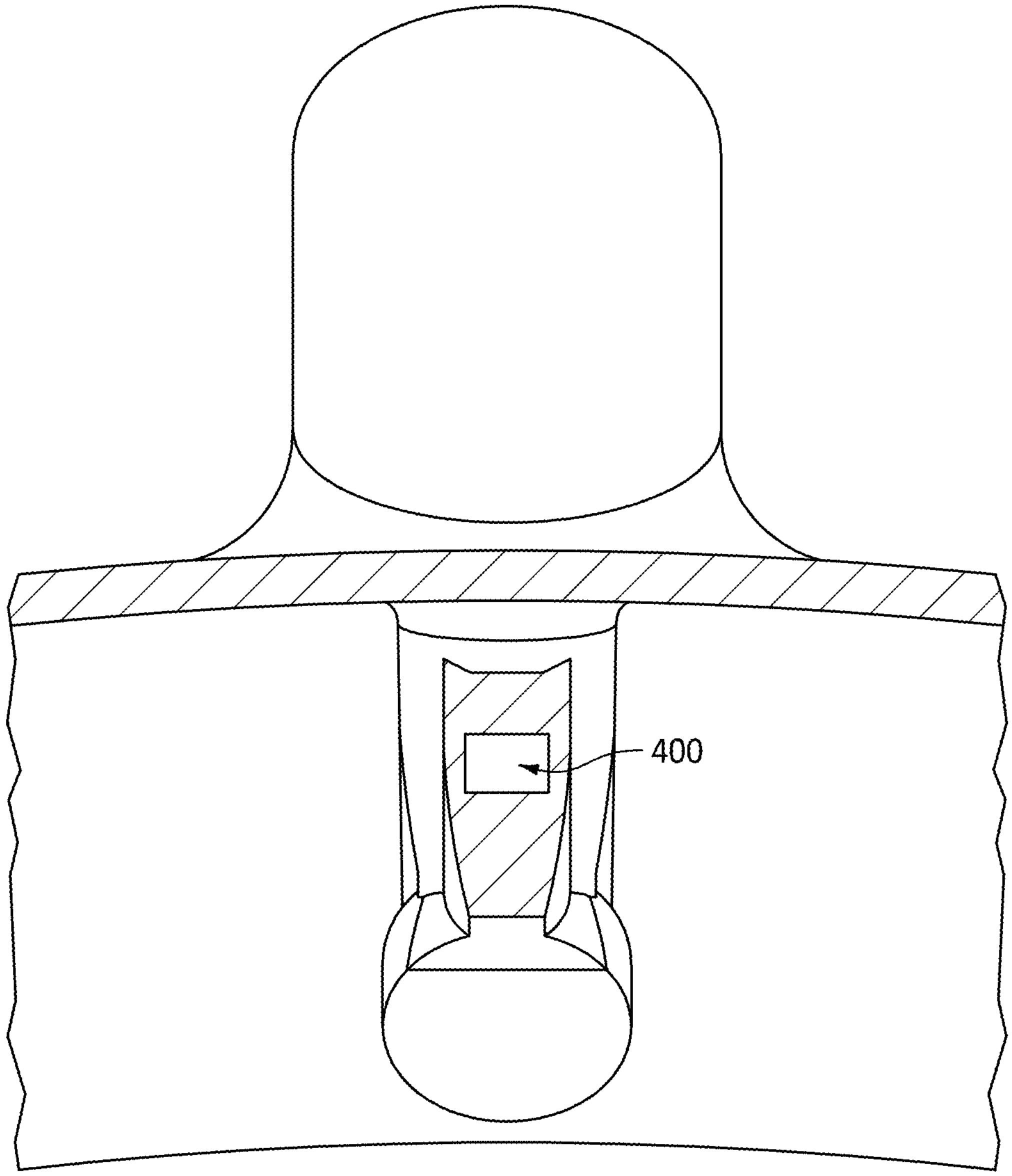
FIG. 14 is a sectional view of the alternate injector and splash plate taken along line 14-14 of FIG. 12.
Figure 15:
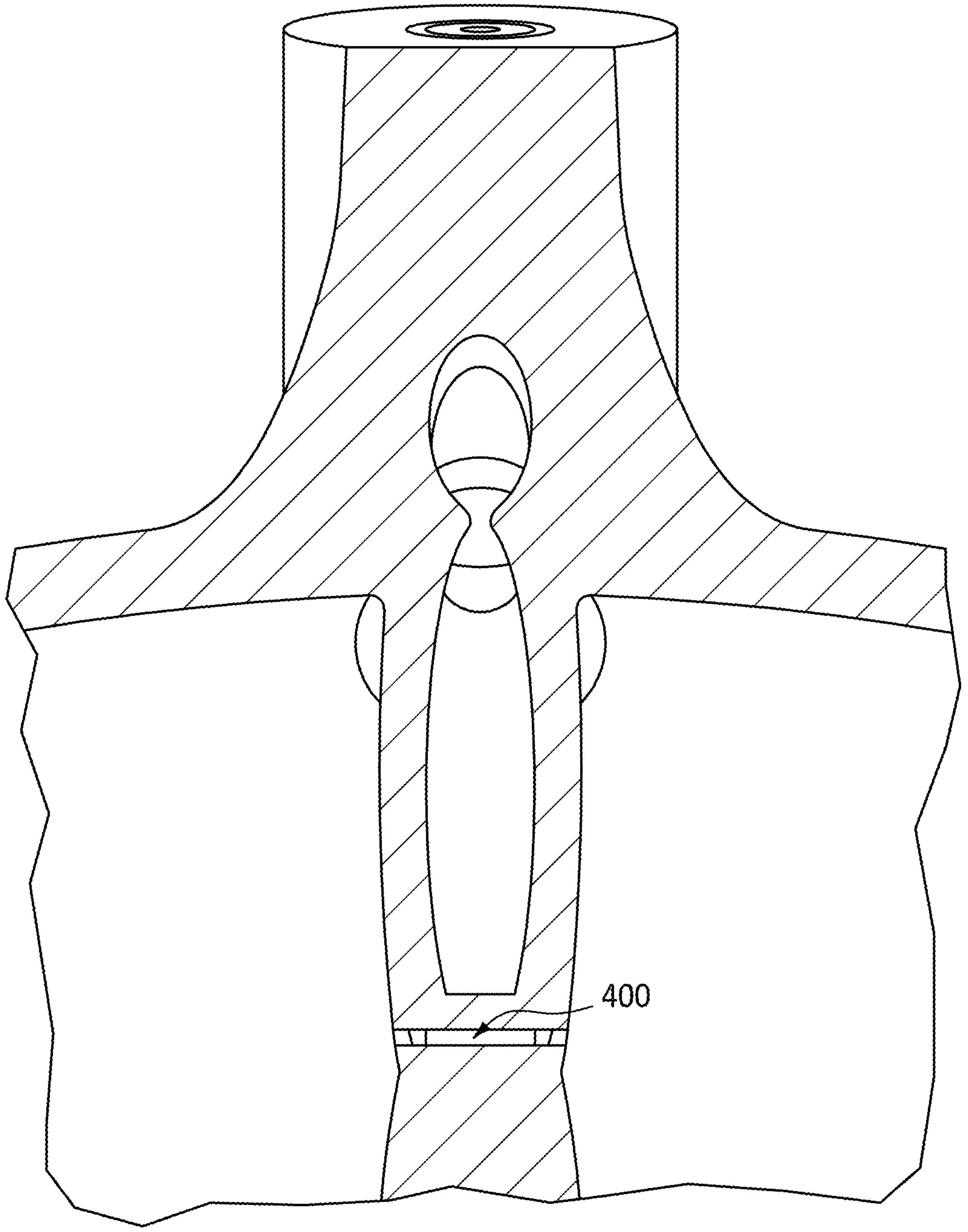
FIG. 15 is a sectional view of the alternate injector and splash plate taken along line 15-15 of FIG. 12.

FIGS. 11-15 show a further variation wherein there is a passageway 400 in the ligament. For purposes of illustration, the dilution chutes are not shown and among other unillustrated portions of the additively manufactured piece. The passageway has an inlet 410 (FIG. 12) on the ligament forward/leading edge 275 and an outlet 412 between the nozzle distal end 260 and the splash plate aft face 262. The example inlet commences as radially elongate and then transitions in cross-section to transversely elongate at the outlet (FIGS. 13-15). This transition may also involve a contraction/restriction in cross-sectional area. As with the passageways in the FIG. 4A gusset, the FIG. 11/12 passageway may be formed in the original additive manufacture process rather than a subsequent machining.

Component materials and manufacture techniques and assembly techniques may be otherwise conventional.

The use of "first", "second", and the like in the following claims is for differentiation within the claim only and does not necessarily indicate relative or absolute importance or temporal order. Similarly, the identification in a claim of one element as "first" (or the like) does not preclude such "first" element from identifying an element that is referred to as "second" (or the like) in another claim or in the description.

One or more embodiments have been described. Nevertheless, it will be understood that various modifications may be made. For example, when applied to an existing baseline configuration, details of such baseline may influence details of particular implementations. Accordingly, other embodiments are within the scope of the following claims.

What is claimed is:

1. A gas turbine engine case structure comprising the unitary combination of:
- a case wall having an inner surface and an outer surface;
- a fuel injector protruding inward from the case wall and having an outlet;
- a splash plate having a first face and a second face, the fuel injector outlet facing the second face; and
- a support connecting the splash plate to the case wall and the fuel injector, wherein:
- the support comprises at least one air passageway with an air outlet opening between the splash plate and the fuel injector outlet; and
- the support comprises:
  - a ligament section extending between the case wall and the splash plate; and
  - a gusset section between the ligament section and the fuel injector.

2. The gas turbine engine case structure of claim 1 wherein:
- the at least one air passageway passes through the gusset section.

3. The gas turbine engine case structure of claim 2 wherein:
- the at least one air passageway passes through the gusset section from at least one inlet at an outer edge of the ligament section.

4. The gas turbine engine case structure of claim 2 wherein:
- the at least one air passageway is a longitudinally arrayed plurality of air passageways.

5. The gas turbine engine case structure of claim 2 wherein:
- the at least one air passageway widens circumferentially and shortens longitudinally from inlet to the air outlet opening.

6. The gas turbine engine case structure of claim 1 wherein:
- the ligament section has a leading edge away from the fuel injector and the at least one air passageway passes from at least one inlet along the leading edge.

7. The gas turbine engine case structure of claim 6 wherein:
- the at least one air passageway is a single air passageway;
- the at least one inlet along the leading edge is a single inlet;
- the single air passageway has a single outlet being said air outlet opening; and
- the single air passageway becomes less elongate in cross-section from the inlet to the air outlet opening.

8. The gas turbine engine case structure of claim 7 wherein:
- the single air passageway tapers in cross-sectional area from the inlet to the air outlet opening.

9. The gas turbine engine case structure of claim 1 having a circumferential array of:
- respective said fuel injectors;
- respective said splash plates; and
- respective said supports.

10. The gas turbine engine case structure of claim 9 further comprising:
- at least one fuel inlet; and
- a fuel plenum fluidically between the at least one fuel inlet and the fuel injectors.

11. A gas turbine engine including the gas turbine engine case structure of claim 1 as a combustor case and further comprising:
- a rotor having a compressor section and a turbine section; and
- a gaspath passing sequentially through the compressor section, a combustion chamber of the combustor case, and the turbine section.

12. A method for manufacturing the gas turbine engine case structure of claim 1, the method comprising additive manufacture as a single piece at least precursors of:
- the case wall;
- the fuel injector;
- the splash plate; and
- the support.

13. The method of claim 12 further comprising:
- machining the single piece to form the fuel injector outlet; and
- plugging an access hole through which the machining was performed.

14. The method of claim 12 wherein:
- the additive manufacture is powder bed fusion-laser beam (PBF-LB).

15. A method for using the gas turbine engine case structure of claim 1, the method comprising:

flowing fuel through the fuel injector to discharge from the fuel injector outlet as a fuel discharge stream; and flowing air through the support at least one air passageway to discharge from the outlet opening as an air discharge stream;

the fuel discharge stream meeting the air discharge stream to form a mixed flow; and combusting the mixed flow.

16. A gas turbine engine case structure comprising the unitary combination of:

a case wall having an inner surface and an outer surface;

a fuel injector protruding inward from the case wall and having an outlet;

a splash plate having a first face and a second face, the fuel injector outlet facing the second face; and a support connecting the splash plate to the case wall and the fuel injector, wherein:

the support comprises:

at least one air passageway with an air outlet opening between the splash plate and the fuel injector outlet; and a ligament section extending between the case wall and the splash plate and a gusset section between the ligament section and the fuel injector; and the at least one air passageway passes through the gusset section but not through the ligament section.

17. A gas turbine engine case structure comprising the unitary combination of:

a case wall having an inner surface and an outer surface;

a fuel injector protruding inward from the case wall and having an outlet;

a splash plate having a first face and a second face, the fuel injector outlet facing the second face; and a support connecting the splash plate to the case wall and the fuel injector, wherein:

the support comprises means for directing air to a gap between the splash plate and the injector to mix with fuel discharged from the fuel injector outlet;

a diffuser plenum is within the case wall; and the means comprises at least one passageway passing through the support from the diffuser plenum.

* * * * *